(12) United States Patent
Sin et al.

(10) Patent No.: US 7,490,160 B2
(45) Date of Patent: Feb. 10, 2009

(54) METHOD OF EFFICIENTLY TRANSMITTING/RECEIVING DATA USING TRANSPORT LAYER IN A MOBILE AD HOC NETWORK, AND NETWORK DEVICE USING THE METHOD

(75) Inventors: Jin-hyun Sin, Seoul (KR); Byung-in Mun, Suwon-si (KR); Song-yean Cho, Seoul (KR); Hyuck Yoo, Seoul (KR); See-hwan Yoo, Seoul (KR); Jin-hee Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 988 days.

(21) Appl. No.: 10/899,103

(22) Filed: Jul. 27, 2004

(65) Prior Publication Data

US 2005/0027878 A1     Feb. 3, 2005

(30) Foreign Application Priority Data

Jul. 28, 2003   (KR) .................. 10-2003-0052052

(51) Int. Cl.
*G06F 15/16* (2006.01)
*G06F 15/173* (2006.01)

(52) U.S. Cl. ..................... 709/237; 709/223

(58) Field of Classification Search ............. 709/223, 709/230, 232, 236, 237; 714/749
See application file for complete search history.

(56) References Cited

U.S. PATENT DOCUMENTS 6,788,704 B1 * 9/2004 Lindsay ............ 714/749

2002/0126692 A1   9/2002 Haartsen
2002/0150064 A1   10/2002 Lucidarme
2004/0215753 A1 * 10/2004 Chan et al. .......... 709/223

FOREIGN PATENT DOCUMENTS

| JP | 3-114334 A | 5/1991 |
| JP | 9-200266 A | 7/1997 |
| WO | WO 02/28020 A2 | 4/2002 |
| WO | WO 02/082571 A1 | 10/2002 |
| WO | WO 02/089416 A2 | 11/2002 |

OTHER PUBLICATIONS

European Search Report dated Nov. 5, 2007 issued in European Application No. 04 25 4462.
Chinese Office Action dated Mar. 28, 2008 issued in corresponding Chinese Application No. 2004-100587445.

* cited by examiner

*Primary Examiner*—Paul H Kang
(74) *Attorney, Agent, or Firm*—Sughrue Mion, PLLC

(57) ABSTRACT

A method of efficiently transmitting/receiving data using a transport layer in a mobile ad hoc network, and a network device using the method. The method includes a first step of setting, by a sending host, a flag for requesting an ACK-response into a predetermined packet of packets contained in a window for data transmission; a second step of sending, by the sending host, the packet with the flag set thereinto and other packets without any flags contained in the window to a receiving host; and a third step of, by the receiving host, receiving the packets transmitted in the second step, and sending the ACK-response to the packet with the flag set thereinto among the received packets.

6 Claims, 6 Drawing Sheets

METHOD OF EFFICIENTLY TRANSMITTING/RECEIVING DATA USING TRANSPORT LAYER IN A MOBILE AD HOC NETWORK, AND NETWORK DEVICE USING THE METHOD

BACKGROUND OF THE INVENTION

This application claims the priority of Korean Patent Application No. 10-2003-0052052 filed on Jul. 28, 2003, in the Korean Intellectual Property Office, the disclosure of which is incorporated herein in its entirety by reference.

1. Field of Invention

The present invention relates to data transmission and reception using a transport layer of the 7 layers of Open System Interconnection (OSI), and more particularly, to a method of efficiently transmitting/receiving data using a transmission control protocol (TCP) of a transport layer in a mobile ad hoc network environment.

2. Description of the Prior Art

In a mobile ad hoc network environment that adopts IEEE 802.11, all nodes share a communication channel. Therefore, since all nodes present in the same communication coverage area communicate over the same channel, it is likely that transmitted data will collide with one another or be lost. Further, the characteristics of a wireless network adversely affect the transmission reliability of link layers. To overcome such drawbacks, there has been proposed a scheme for attempting to achieve reliable data transmission by using TCP at the transport layer level.

FIG. 1 is an exemplary view illustrating TCP operations in the related art, wherein a sending party sends packets to a receiving party that in turn sends the sending party ACK-response packets in response to the packets received from the sending party. At this time, the receiving party sends the ACK-response packets while maintaining the maximum value of sequence numbers of successive packets that have been received from the sending party, so that transmission amounts by the sending party cannot be reduced even though some of the ACK-response packets such as 2'ACK-response packet are lost.

TCP is a protocol for the transport layer in a TCP/IP architecture and is mainly responsible for the control of data flow and error. In particular, TCP adopts the concept of a "window" for the control of data flow, whereby only the amount of data corresponding to the size of a window is sent when data to be transmitted have been stored in a buffer by means of an application program. At this time, the size of the window is determined depending on a destination host or network congestion and thus can be increased or decreased. Particularly, TCP adopts a sliding window technique. With the use of such concept of a window, the utilization of wireless links can be maximized.

However, since TCP usually generates ACK-response packets for most of the incoming packets, channel competition of the ACK-response packets with data packets may occur. Further, in a wireless environment adopting a Request to Send/Clear to Send (RTS/CTS) scheme, the utilization of channels in a wireless network may be greatly reduced due to ACK-response packets. Therefore, to overcome such drawbacks, there exists a need for decrease in the number of ACK-response packets.

SUMMARY OF THE INVENTION

The present invention addresses the above problems. An aspect of the present invention is to provide a method of improving the efficiency of data transmission while reducing the number of ACK-response packets for transmitted data packets when TCP communications are established between sending and receiving nodes in a mobile ad hoc network environment.

In order to achieve the aspect of the present invention, a method of efficiently transmitting/receiving data using a transport layer in a mobile ad hoc network consistent with an embodiment of the present invention comprises a first step of setting, by a sending host, a flag for requesting an ACK-response into a predetermined packet of packets contained in a window for data transmission; a second step of sending, by the sending host, the packet with the flag set thereinto and other packets without any flags contained in the window to a receiving host; and a third step of, by the receiving host, receiving the packets transmitted in the second step, and sending the ACK-response to the packet with the flag set thereinto among the received packets.

The first step may comprise the step of creating a new window if the sending host receives the ACK-response from the receiving host, and setting a flag for requesting an ACK-response into a predetermined packet of packets contained in the new window.

The first step may comprise the step of creating a new window if the sending host receives an ACK-response to a TCP segment used for round-trip time (RTT) measurement from the receiving host, and setting a flag for requesting an ACK-response into a new TCP segment for RTT measurement contained in the new window.

Meanwhile, the third step may further comprise the step of, if packet loss occurs, sending an ACK-response to packets that have been received before the packet loss occurs.

Further, a network device for efficiently transmitting/receiving data using a transport layer in a mobile ad hoc network consistent with another embodiment of the present invention comprises a first network interface unit for transmitting and receiving data to and from a separate second wireless network device; a transmission buffer for storing data packets to be sent to the second wireless network device, and transferring the data packets to the first network interface unit; and a sending party's ACK-control unit for creating a new window in the transmission buffer if the data received from the first network interface unit corresponds to an ACK-response, and setting a flag for requesting an ACK-response into a predetermined packet of packets contained in the created window.

The sending party's ACK-control unit may create a new window in the transmission buffer if an ACK-response to a TCP segment for RTT measurement from the second wireless network device, and set a flag for requesting an ACK-response into a new TCP segment for RTT measurement contained in the new window.

The second wireless network device may receive the packets from the first wireless network device, and send an ACK-response to the received packets to the first wireless network device if the flag for requesting the ACK-response has been set into the relevant packet. At this time, the second wireless network device may receive the packet from the first wireless network device, and if the packets correspond to TCP packets for the RTF measurement, send an ACK-response to the TCP packets to the first wireless network device.

BRIEF DESCRIPTION OF THE DRAWINGS

The above and other aspects and features of the present invention will become apparent from the following description exemplary embodiments given in conjunction with the accompanying drawings, in which.

DETAILED DESCRIPTION OF THE INVENTION

Hereinafter, a method and device for efficiently transmitting/receiving data in a mobile ad hoc network environment consistent with embodiments of the present invention will be described with reference the accompanying drawings. Meanwhile, since each terminal can serve as both sending and receiving hosts in the mobile ad hoc network environment, the embodiments of the present invention will be described on the assumption that a terminal for sending packets is considered a sending host while the other terminal for receiving the packets and sending ACK-responses to the packets is considered a receiving host.

Figure 1:
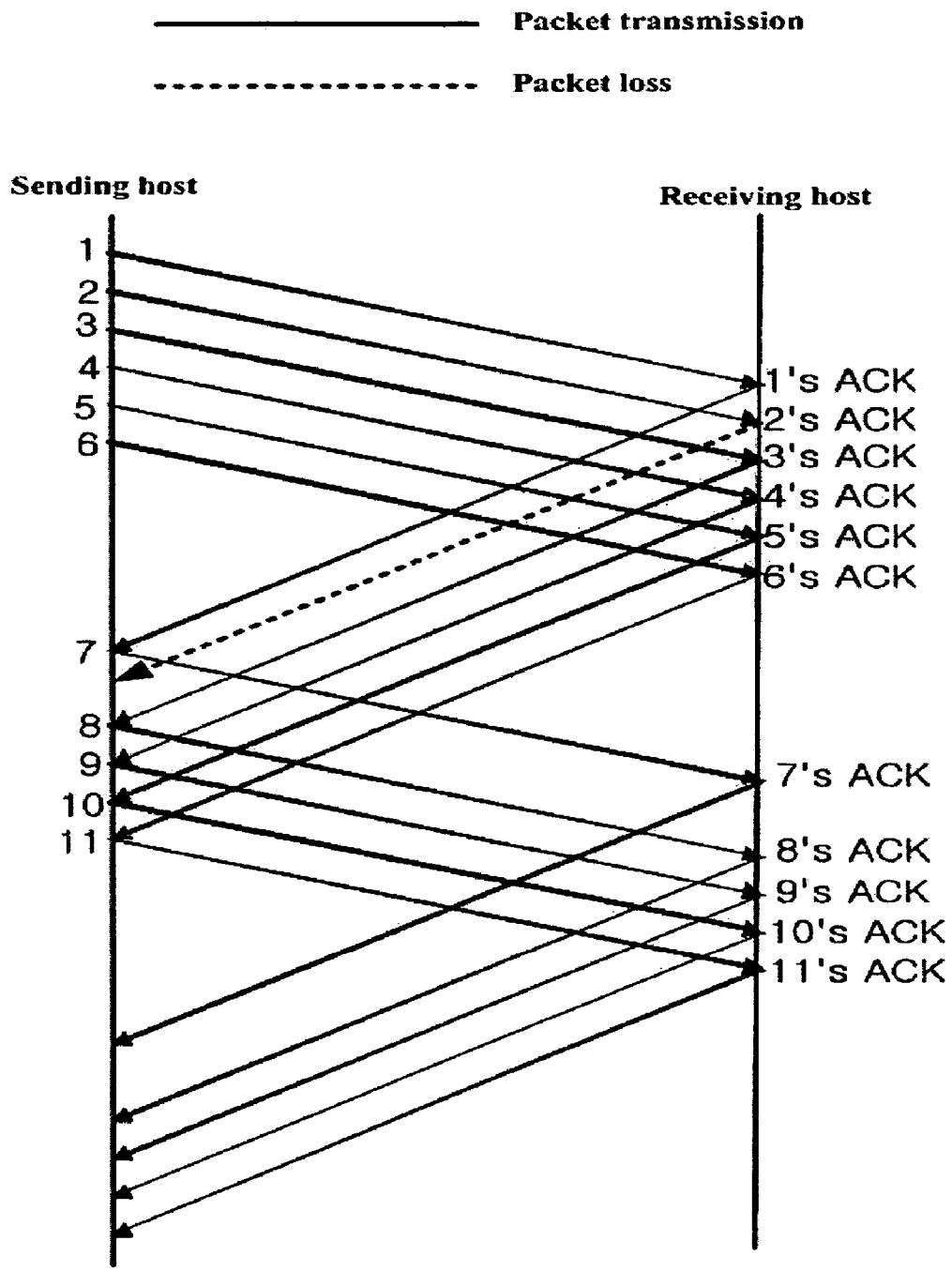
FIG. 1 is an exemplary view illustrating TCP operations in the related art.
Figure 2:
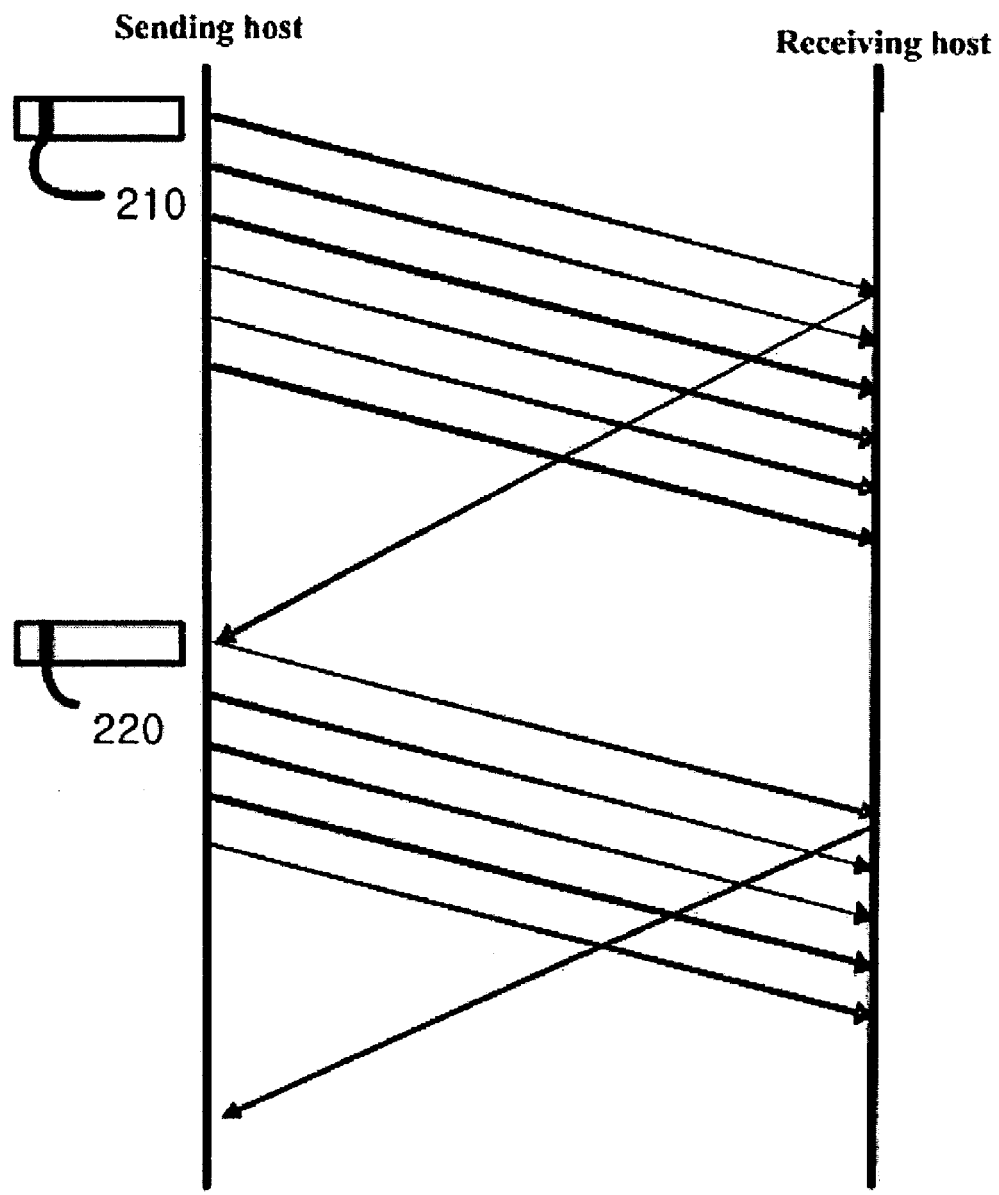
FIG. 2 is an exemplary view illustrating transmission of TCP packets consistent with an embodiment of the present invention.

FIG. 2 is an exemplary view illustrating transmission of TCP packets consistent with an embodiment of the present invention, wherein a sending host controls the amount of packets to be transmitted using a window in order to send TCP packets. More specifically, the sending host sets flags 210 and 220 for requesting ACK-responses into a header of a first packet of packets contained in a window that has been newly opened for packet transmission. A receiving host sends ACK-response packets to the sending host only when the receiving host has received packets into which such flags have been set.

Figure 3:
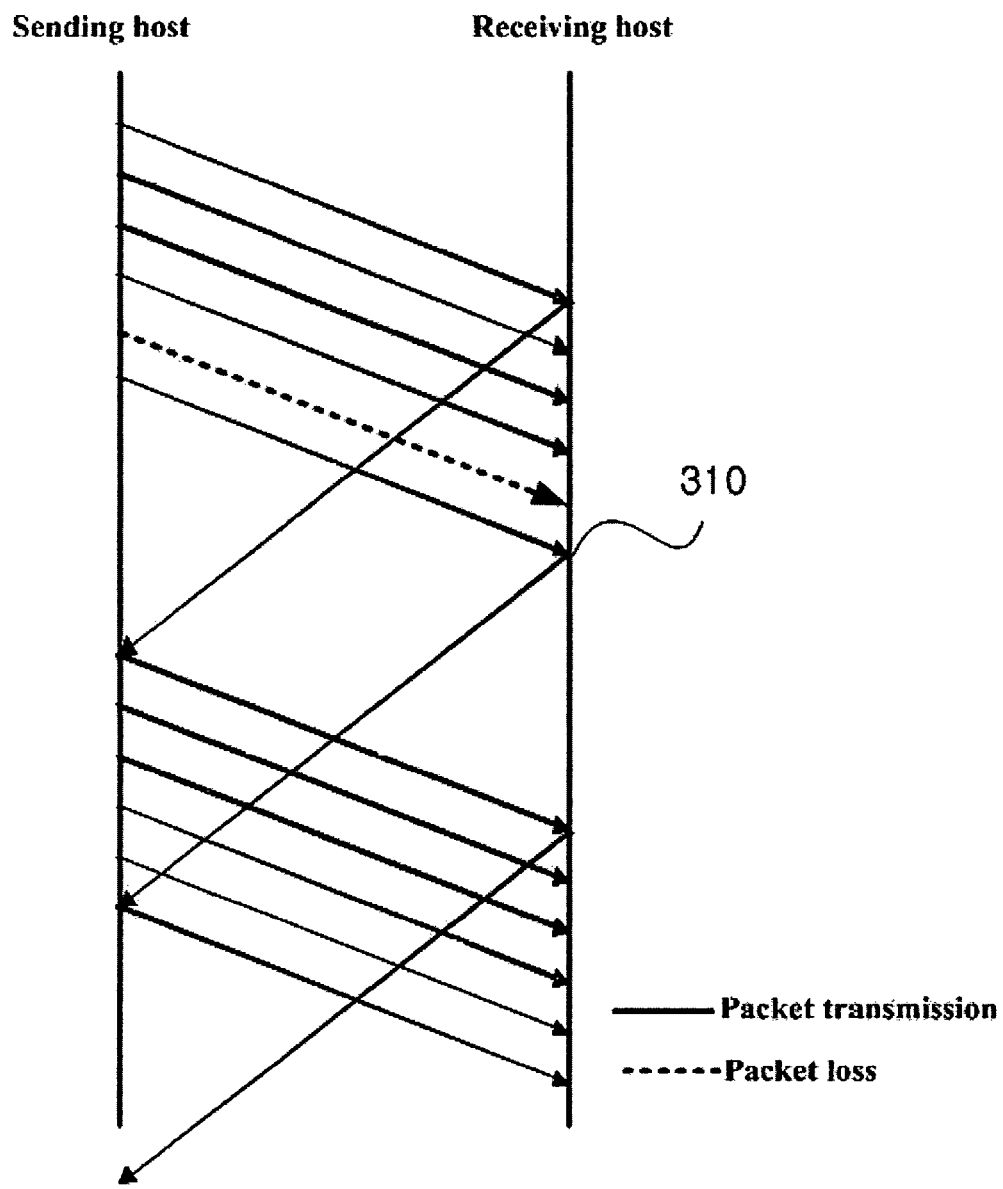
FIG. 3 is an exemplary view illustrating the process of dealing with the occurrence of a loss of a TCP packet according to an embodiment of the present invention.

FIG. 3 is an exemplary view illustrating the process of dealing with the occurrence of a loss of a TCP packet consistent with an embodiment of the present invention. If one of the packets transmitted from the sending host is lost, the receiving host can recognize the occurrence of the loss of the packet at a point 310. In this case, the lost packet can be recovered by sending the sending host an ACK-response packet requesting retransmission of the lost packet.

Figure 4:
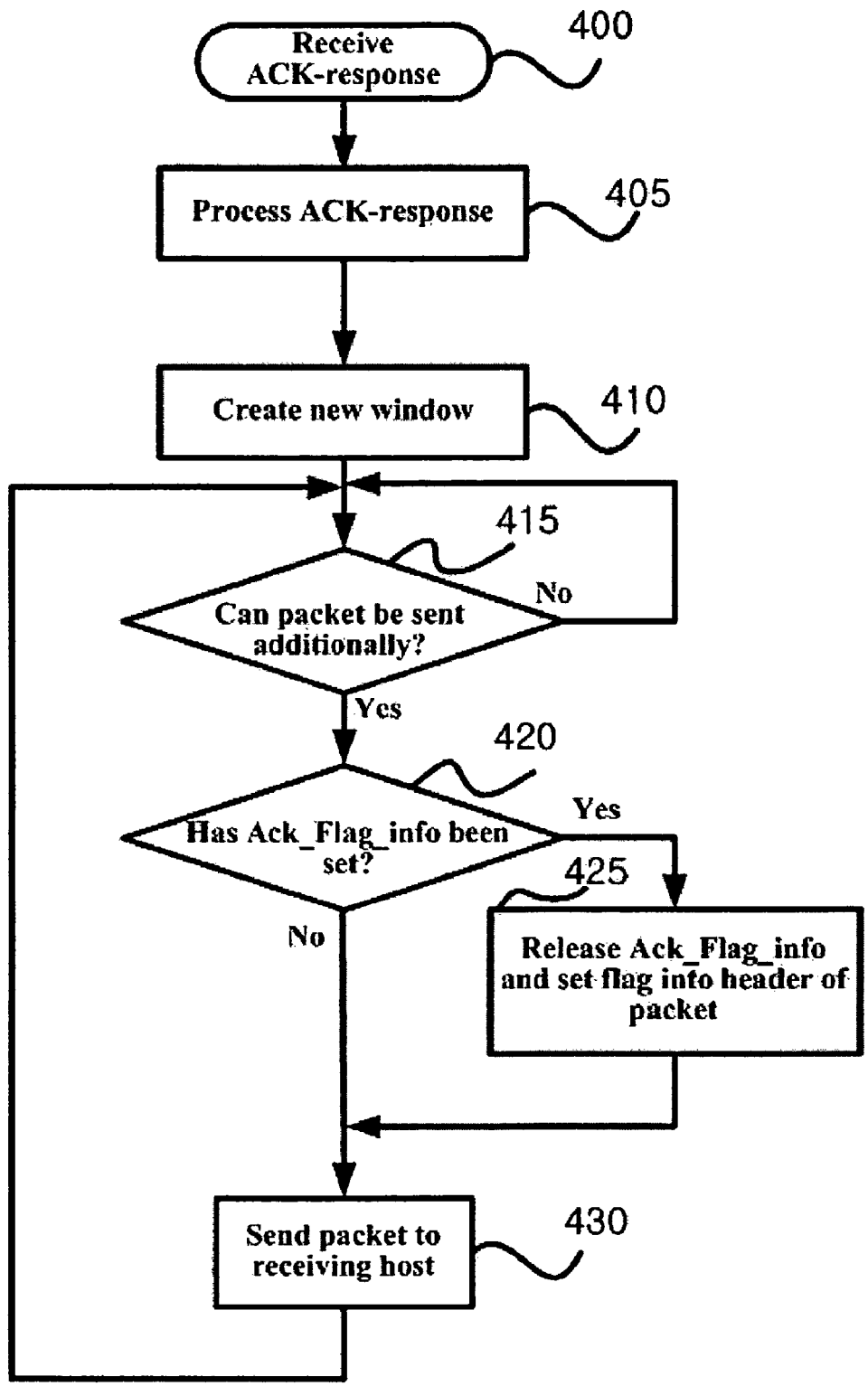
FIG. 4 is a flowchart illustrating a data transmitting process performed by a sending host consistent with an embodiment of the present invention.

FIG. 4 is a flowchart illustrating a data transmitting process performed by the sending host consistent with an embodiment of the present invention. At first, the sending host receives an ACK-response packet from the receiving host (400). The sending host processes the received ACK-response packet (405). If the received ACK-response packet corresponds to an ACK-response to a data packet, the procedure proceeds to the next step. However, if the received ACK-response packet corresponds to a response to a packet for measurement of round-trip time (RTT), RTT is calculated by an RTT operation method for use in TCP, and the value of Ack_Flag_info is set into a data area of a packet to be transmitted in order to measure RTT. The value of Ack_Flag_info is used when a flag for requesting an ACK-response is set into a header of a subsequent TCP packet to be transmitted. TCP uses only one packet for each RTT upon measurement of RTT. Therefore, as described above, it is possible to measure RTT by causing an ACK-response packet for a packet used for measuring RTT to be received. Further, even when the received ACK-response corresponds to an ACK-response to the loss of a data packet that has already been transmitted, it is necessary to retransmit the lost data packet. Thus, this case is subjected to the same process as that performed for the ACK-response to the packet used for measuring RTT.

A new window is created after the sending host performs such a process for the ACK-response (410). At this time, an additional packet may be sent in a case where an ACK-response packet for a data packet is received. However, if there is an ACK-response due to packet transmission errors or there is no room left in a reception buffer of the receiving host, the errors may be first processed or a stand-by state is maintained until room is produced in the reception buffer (415).

When a new window is created (410) and it is also possible to send an additional packet, the sending host checks whether the value of Ack_Flag_info is set into a data area of the packet (420). If the value of Ack_Flag_info has not been set, it means that the packet corresponds to a packet which does not request an ACK-response from the receiving host. In this case, the sending host sends the packet to the receiving host (430). If the value of Ack_Flag_info has been set, the sending host releases the value of Ack_Flag_info present in the data area and sets a flag for requesting an ACK-response in the header of the packet (425). In this case, the sending host may use a 'reserved' or 'option' field in the TCP header upon setting the flag. When the flag for requesting an ACK-response is set into the header of the packet and the receiving host then receives the packet, the receiving host makes an ACK-response. The above process is repeated by checking whether the packet contained in the created window can be sent additionally (415), after the sending host sends the packet to the receiving host (430).

Figure 5:
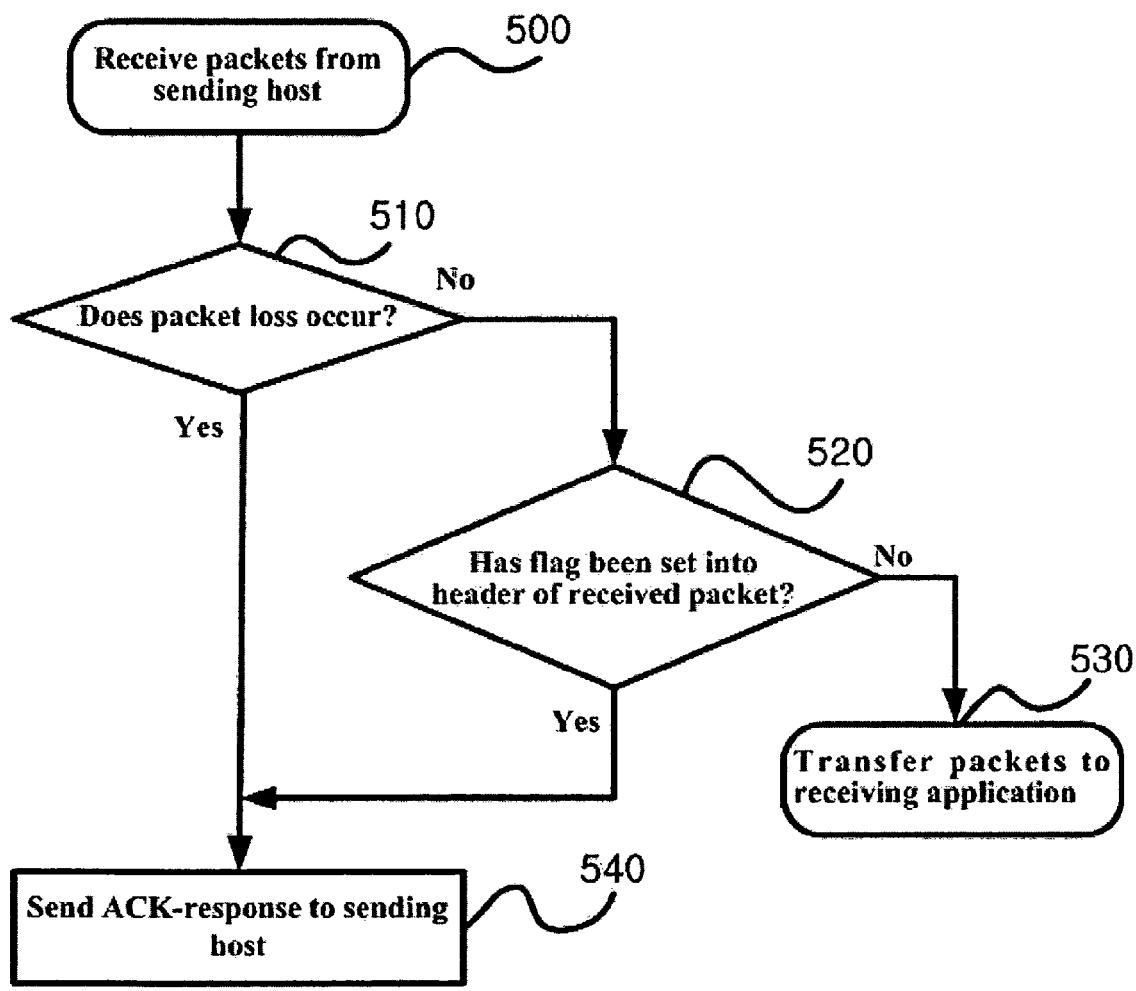
FIG. 5 is a flowchart illustrating a data transmitting process performed by a receiving host consistent with an embodiment of the present invention.

FIG. 5 is a flowchart illustrating a data transmitting process performed by the receiving host consistent with an embodiment of the present invention. When the receiving host receives packets from the sending host (500), it determines, based on the received packets, whether there is any loss of the packets that have been already sent by the sending host (510). If packet loss occurs, an ACK-response is sent to the sending host (540). The determination on whether packet loss has occurred in the receiving host (510), and the transmission of the ACK-response associated therewith (540) are performed using an existing method of controlling TCP packet flow.

Meanwhile, if it is checked in step 510 that packet loss has not occurred, it is checked whether a flag for requesting an ACK-response has been set into a header of one of the received packets (520). If so, an ACK-response is transmitted to the sending host (540). Otherwise, the received packets are forwarded to a receiving application (530).

Figure 6:
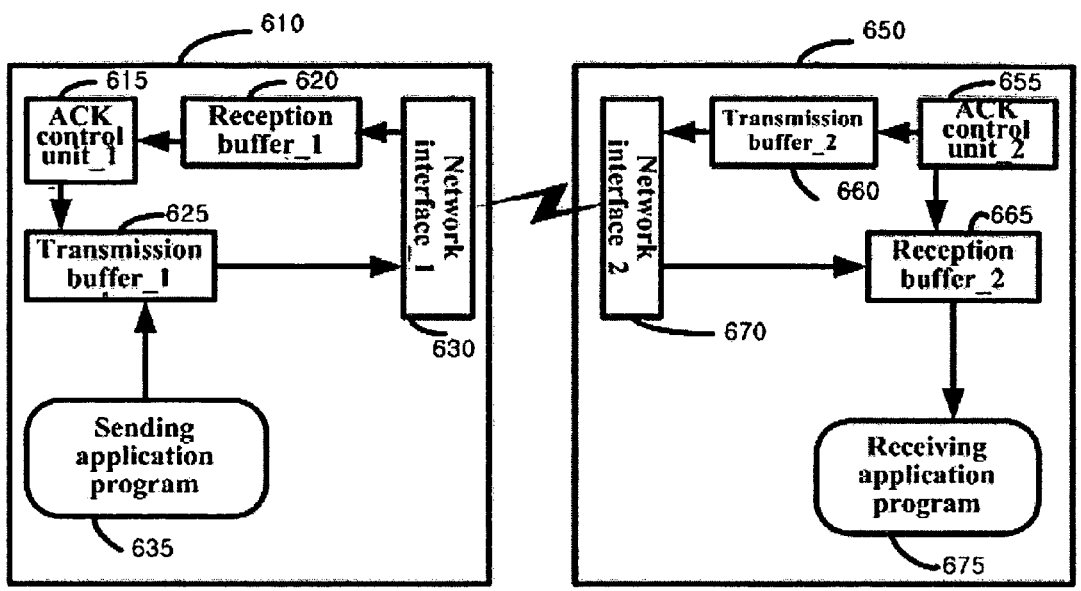
FIG. 6 is a block diagram of sending and receiving hosts between which TCP communications are established, consistent with an embodiment of the present invention.

FIG. 6 is a block diagram of the sending and receiving hosts between which TCP communications are established, consistent with an embodiment of the present invention. For the sake of convenience of explanation, it is assumed that a network device for sending packets is considered a sending host 610 while the other network device for receiving the packets and sending ACK-responses for the packets is considered a receiving host 650. It will be apparent to those skilled in the art that since network devices capable of performing TCP communications have both functions of transmitting and receiving data, the sending host 610 may serve as a receiving host and the receiving host 650 may serve as a sending host. Accordingly, the sending host 610 and the receiving host 650 may commonly have network interfaces 630 and 670; reception buffers 620 and 665; transmission buffers 625 and 660;

and ACK_control units 615 and 655. For convenience of explanation, they are shown in symmetrical configurations.

When data to be sent to the receiving host 650 are forwarded from a sending application program 635 to the transmission buffer_1 625, the transmission buffer_1 625 stores the forwarded data therein. Meanwhile, when the network interface_1 630 receives an ACK-response packet from the receiving host 650, the ACK-response packet is stored in the reception buffer_1 620. The ACK control unit_1 615 examines the kind of ACK-response packet stored in the reception buffer_1 620. If the stored ACK-response packet corresponds to an ACK-response packet for a data packet, the ACK control unit_1 615 creates a new window. Thereafter, the ACK control unit_1 615 sets a flag for requesting an ACK-response in a header of a first packet of data packets belonging to the new window among the data packets stored in the transmission buffer_1 625. Then, the ACK control unit_1 615 sends the data packets contained in the window to the receiving host 650 via the network interface_1 630.

Meanwhile, the receiving host 650 receives the data packets sent by the sending host 610 via the network interface_2 670, and then stores them in the reception buffer_2 665.

At this time, the ACK control unit_2 655 checks whether a flag for requesting an ACK-response has been set into the header of the relevant packet of the data packets stored in the reception buffer_2 665. If not so, the stored packets are transferred to the receiving application program 675. However, if it is checked that the flag has been set, an ACK-response packet is transferred to the transmission buffer_2 660, which in turn sends it to the sending host 610 via the network interface_2 670.

Consistent with the present invention constructed as above, the number of ACK-response packets for data packets in a mobile ad hoc network environment is reduced, thereby increasing the utilization of TCP links and improving the performance of a transport layer's protocol.

The present invention described above is not limited to the embodiments illustrated in the accompanying drawings, since those skilled in the art can make various substitutions, changes and modifications without departing from the technical spirit and scope of the present invention.

What is claimed is:

1. A method of transmitting/receiving data, comprising:
    setting, by a sending host, a flag for requesting an ACK-response into a predetermined packet of packets contained in a window for data transmission;
    sending, by the sending host, the packet with the flag set thereinto and other packets without any flags contained in the window to a receiving host; and
    by the receiving host, receiving the packets sent by the sending host, and sending the ACK-response to the packet with the flag set thereinto among the received packets,
    wherein setting, by a sending host, a flag for requesting an ACK-response into a predetermined packet of packets contained in a window for data transmission comprises creating a new window if the sending host receives an ACK-response to a Transmission Control Protocol (TCP) segment used for Round-trip Time (RTT) measurement from the receiving host, and setting a flag for requesting an ACK-response into a new TCP segment for RTT measurement contained in the new window.

2. The method as claimed in claim 1, wherein setting, by a sending host, a flag for requesting an ACK-response into a predetermined packet of packets contained in a window for data transmission comprises creating a new window if the sending host receives the ACK-response from the receiving host, and setting a flag for requesting an ACK-response into a predetermined packet of packets contained in the new window.

3. The method as claimed in claim 1, wherein by the receiving host, receiving the packets sent by the sending host, and sending the ACK-response to the packet with the flag set thereinto among the received packets further comprises:
    if packet loss occurs, sending an ACK-response to packets that have been received before the packet loss occurs.

4. A first wireless network device, comprising:
    a first network interface unit operable to transmit and receive data to and from a separate second wireless network device;
    a transmission buffer operable to store data packets to be sent to the second wireless network device, and transfer the data packets to the first network interface unit; and
    a sending party's ACK-control unit operable to create a new window in the transmission buffer if the data received from the first network interface unit corresponds to an ACK-response, and set a flag for requesting an ACK-response into a predetermined packet of packets contained in the created window,
    wherein the sending party's ACK-control unit creates a new window in the transmission buffer if an ACK-response to a TCP segment for RTT measurement is received from the second wireless network device, and sets a flag for requesting an ACK-response into a new TCP segment for RTT measurement contained in the new window.

5. The device as claimed in claim 4, wherein the second wireless network device receives the packets from the first wireless network device, and sends an ACK-response to the received packets to the first wireless network device if the flag for requesting the ACK-response has been set into the relevant packet.

6. The device as claimed in claim 5, wherein the second wireless network device receives the packets from the first wireless network device, and if the packets correspond to TCP packets for the RTT measurement, sends an ACK-response to the TCP packets to the first wireless network device.

* * * * *